United States Patent Office 3,679,429
Patented July 25, 1972

3,679,429
CAT FOOD WITH HEXAMIC ACID FLAVORANT
Robert K. Mohrman, Belleville, Ill., and Paul E. Kifer, Webster Groves, and Edward V. Oborsh, Ballwin, Mo., assignors to Ralston Purina Company, St. Louis, Mo.
No Drawing. Continuation-in-part of application Ser. No. 763,924, Sept. 30, 1968. This application May 14, 1969, Ser. No. 824,708
Int. Cl. A23k 1/00
U.S. Cl. 99—2          6 Claims

ABSTRACT OF THE DISCLOSURE

This application discloses a method of enhancing the flavor of an animal feed composition by adding a flavor improving acid to the feed composition. The acid may be applied directly to the food particle, applied over a fat coating, or incorporated in a fat coating. The flavoring acid may be added in the amount of 0.05 to 5% by weight of the feed.

---

This application is a continuation-in-part of U.S. application Ser. No. 763,924, filed Sept. 30, 1968.

Dried, particulate animal foods or animal foods with low or intermediate moisture content are generally regarded as providing the best nutrition for animals. Dried products of this type are usually small discrete particles or kibs formed as extruded chunks in the manner disclosed in U.S. Pat. 3,119,619, as baked or dried biscuits or chunks as described by U.S. Pats. 309,503 and 1,354,068, or as pelleted chunks as described by U.S. Pat. 2,168,532. The dried particles usually have a moisture content as great as 10% by weight. Intermediate products having a moisture content of about 30% by weight may be formed in the manner described by U.S. Pat. 3,202,514. Products of the dried or intermediate type have the disadvantage of not being as palatable to animals as the usual canned type foods. The canned foods are not as nutritious as dried foods in part because of a much greater moisture content, usually about 75%. However, animals often exhibit a marked preference for the canned type foods. Dried or intermediate foods are not accepted by animals as readily as canned foods.

We have found that it is possible to increase the palatability of dried and intermediate moisture animal foods to a point where animals readily accept a dried or intermediate product. The method for increasing the palatability involves adding a flavor enhancing acid to the food composition. The acid may be added to the food particles to cover a major portion of the exposed surfaces of the particles, but it need not be applied as a continuous film or layer. Some exposed areas on the particle surfaces which are not covered with acid will not prevent the acid coated areas from producing a substantial increase in the particle palatability. Flavor enhancing acids include the inorganic or mineral acids such as sulfuric, hydrochloric and phosphoric, and the organic acids such as citric, tartaric, fumaric, lactic, acetic and hexamic acid ($C_6H_{13}NO_3S$). We have found that phosphoric acid, citric acid and hexamic acid produce the greatest increase in palatability with the addition of small amounts of the acid. The acid can be added in amounts ranging from about 0.05 to 5% of the food particle, depending on the acid used. However, the preferred range of addition for phosphoric acid is .35 to 1%. The preferred range of addition for citric acid is .5 to 1%. The preferred range of addition for hexamic acid is about 0.05 to .3%.

The coated particles of kibs may have the flavor enhancing acid in a concentrated layer at the kib surface in our invention. The layer may be formed by coating the acid onto the exposed surfaces of kibs or by coating the acid onto kibs which have been fat coated, but the layer need not be continuous. Kibs which have been coated with acid may be coated with an outer layer of fat. The acid layer may also be formed by coating the kibs with a dispersion of fat and acid. Five to twelve percent edible fat, preferably an animal fat such as lard or tallow, may be added to the kibs in the coating process. The fat coating partially seals the kibs from the influence of moisture and may act as a carrier for the acid. Satisfactory methods for applying the acid are spraying a concentrated solution of the acid or by dusting powdered or anhydrous acid on the particles. The fat is best applied by spraying at a temperature above the fat melting point.

The acid treated product may be fed to animals dry or it may be moistened with water. The acid on the surface of the food particles provides an unusual and unexpected boost in palatability. When animals eat the coated particles the acid is present on the surface and is immediately available to the animals' taste sensors. The stimulation that the acid provides is thus achieved at low levels of acid addition and the possibility of significantly disturbing the nutritional balance of the food particles is avoided. Any acid in the mass of the food material will, of course, provide additional flavor as the animal consumes the food, though the flavor boost may not be as great as that provided by the flavoring acid present at the surface.

The added acid also provides a preservative or antimycotic action and inhibits spoilage due to contamination. The preservative effect can be increased by using additional preservative, antimycotic, or humectant materials with the flavor enhancing acid. Propylene glycol, potassium sorbate, sorbic acid, BHT, BHA, ethoxyquin or other equivalent materials may be used with the acid as preservatives.

The invention is more fully described by the following examples which are intended to be representative of preferred embodiments of the invention and not restrictive of the scope of the invention.

EXAMPLE 1

Dried extruded kibs at about 120° F. were carried from a drier to the top of a spray chamber by a belt conveyor. The kibs were dropped from the conveyor belt in a sheet and fell through the spray chamber. Spray heads located on both sides of the falling sheet sprayed a dispersion of phosphoric acid and melted tallow on the hot kibs as they fell through the spray chamber. The dispersion of melted tallow and phosphoric acid was formed by conducting tallow at about 140° F. from a staging tank and 75% feed grade phosphoric acid from an acid tank to a metering pump. The pump blended the fat and acid in a ratio of 14 parts by weight fat to 1 part by weight acid. The acid-fat dispersion was conducted to the spray heads and sprayed on the kibs in a ratio of 15 parts by weight dispersion to 185 parts by weight of kibs. The spray coated kibs were collected at the bottom of the spray chamber and were conveyed to a tumbling drum. The tumbling drum was maintained at a temperature above the melting point of the fat, approximately 140° F. The kibs were tumbled in the drum at about 12 revolutions per minute for about three minutes or until the kibs had a substantially uniform coating of fat and acid. The coated kibs were removed from the tumbling drum and cooled to ambient temperature. The cooled kibs had a coating containing 7% by weight added fat and .375% by weight phosphoric acid based on the total weight of the coated kib.

EXAMPLE 2

Hot pelleted kibs were carried from the pelleting die to the top of a spray chamber by belt conveyor. The kibs dropped from the conveyor in a sheet and fell through the spray chamber. Spray heads located on both sides of the falling sheet sprayed 50% phosphoric acid. The acid was sprayed on the kibs in the ratio of 3 parts acid by weight to 187 parts by weight kibs. The acid coated kibs were collected at the bottom of the spray chamber and were conveyed to a second spray chamber. The acid coated kibs were dropped in a sheet through the second spray chamber and were spray coated with fat at about 140° F. The fat was sprayed on the kibs in the ratio of 10 parts by weight fat to 190 parts by weight of acid coated kibs. The fat coated kibs were collected at the bottom of the spray chamber and were conveyed to a tumbling drum. The drum was maintained at about 140° F. The kibs were tumbled in the drum at about 12 revolutions per minute. Substantially uniformly coated kibs were removed from the drum after about three minutes and cooled to ambient temperature. The cooled kibs had a coating containing about .75% phosphoric acid and 5% fat based on the total weight of the coated kib.

EXAMPLE 3

Hot baked kibs were carried from an oven to the top of a spray chamber by a belt conveyor. The kibs dropped from the conveyor belt in a sheet and fell through the spray chamber. Spray heads located on both sides of the falling sheet sprayed melted animal fat at about 140° F. on the kibs. The fat was sprayed on the kibs in the ratio of 20 parts by weight fat to 172 parts by weight kibs. The fat coated kibs were collected at the bottom of the spray chamber and were conveyed to a tumbling drum. The kibs were tumbled in the drum at about 140° F. and at about 12 revolutions per minute for about 3 minutes, to coat the fat substantially uniformly on the kibs. The fat coated kibs were discharged from the tumbling drum and conducted to a second spray chamber where they were sprayed with 75% solution of phosphoric acid. The acid was sprayed on the kibs in a ratio of 8 parts by weight acid solution to 192 parts by weight fat coated kibs. The kibs were collected at the bottom of the spray chamber and were removed. The kibs were covered with 3% phosphoric acid and 10% added fat based on the total weight of the coated kib.

EXAMPLE 4

An intermediate moisture animal food with a moisture content of about 25% was cut into plastic cylinders of about ½ inch length. The cylinders were conducted to a tumbling drum and were tumbled gently in the drum at about 12 revolutions per minute. Enough water was sprayed into the drum to bring the moisture content of extruded cylinders to about 30%. The rotation of the drum was continued until the added moisture had permeated the extruded cylinders. A dispersion of melted fat and phosphoric acid formed of 24 parts by weight animal fat and 11 parts by weight 75% phosphoric acid was then sprayed into the tumbling drum in the ratio of 35 parts by weight fat and acid dispersion to 165 parts by weight of moistened extruded cylinders. The tumbling drum was rotated until the cylinders were substantially uniformly covered with the dispersion. The coated cylinders were then removed from the tumbling drum. The coated cylinders had a coating composed of 10% added fat and about 4% phosphoric acid based on the total weight of the coated cylinders.

EXAMPLE 5

The extruded cylinders were moistened and tumbled in a manner described in Example 4. The moistened cylinders were then coated with 16 parts by weight melted fat for each 182 parts moistened cylinders by spraying the melted fat into the rotating tumbling drum. After the fat was added the drum was rotated until the cylinders were coated substantially uniformly with the fat. Then two parts of powdered phosphoric acid were dusted into the tumbler in a gas stream, and the tumbling was continued until the particles were substantially uniformly coated. The coated cylinders had a coating composed of 8% added fat and 1% phosphoric acid based on the total weight of the coated cylinders.

EXAMPLE 6

A coated cylinder having a coating of 7% added fat and 1% citric acid was formed by using 14 parts melted fat and 2 parts powdered citric acid to 184 parts of moistened cylinders by using the process described in Example 5.

EXAMPLE 7

A coated cylinder having a coating of 6% added fat and 0.5% citric acid was formed by using 12 parts melted fat and 1 part powdered citric acid to 187 parts of moistened cylinders by using the process described in Example 5.

EXAMPLE 8

A coated cylinder having a coating of 6% added fat and 0.05% hexamic acid was formed by using 120 parts melted fat and 1 part powdered hexamic acid to 1879 parts of moistened cylinders by using the process described in Example 5.

EXAMPLE 9

Dried extruded kibs were dropped through a spray chamber in a flat sheet. Spray heads on both sides of the falling sheet sprayed a hot fat dispersion containing 3 parts by weight hexamic acid to 100 parts by weight melted fat. The acid-fat dispersion was sprayed on the kibs in the ratio of 103 parts by weight dispersion to 1897 parts by weight of kibs. The coated kibs were collected at the bottom of the spray chamber and were conveyed to a tumbling drum. The drum was maintained at about 140° F. The kibs were tumbled in the drum at about 12 revolutions per minute. The kibs were removed from the drum and cooled to ambient temperature. The kibs had about 5% added fat and 0.15% added hexamic acid.

EXAMPLE 10

One part by weight hexamic acid was added to 819 parts by weight (dry basis) of a standard dry cat food formulation. The mix was tempered to a moisture content of about 30% by weight and formed into kibs by a conventional extrusion process. The extruded kibs were dried and coated with 80 parts by weight fat to 920 parts by weight of kibs. The kibs had about 8% by weight added fat, about 10% by weight moisture and about 0.1% by weight hexamic acid.

Animal food products prepared by the method of our invention exhibit an increase in palatability and an acceptance by animals, particularly cats, which is quite marked and unexpected. Cats fed free choice often will consume two to five times as much of the product of this invention as they will consume of an untreated product having the same nutritional composition and formulation. Table I summarizes a series of tests conducted with standard commercial cat rations for a period of five days. Portions of the ration fed plain were compared with the same ration treated by the method of this invention. It is apparent from Table I that the acid treated rations exhibited an unexpected and wholly unprecedented increase in palatability.

TABLE I

| Ration | Total consumed (grams) | Cats preferred Male | Cats preferred Female | Cats no preference Male | Cats no preference Female |
|---|---|---|---|---|---|
| Plain dry ration | 719 | 0 | 0 | 0 | 0 |
| .375% H₃PO₄ coating | 3,738 | 6 | 6 | | |
| Plain dry ration | 895 | 1 | 1 | 0 | 0 |
| .75% H₃PO₄ coating | 2,816 | 5 | 5 | | |
| Plain dry ration | 4,735 | 3 | 2 | 0 | 0 |
| .5% citric acid coating | 7,438 | 5 | 6 | | |
| Plain dry ration | 3,075 | 2 | 2 | 0 | 0 |
| 1% H₃PO₄ coating | 6,070 | 6 | 6 | | |
| Plain dry ration | 4,692 | 2 | 3 | 1 | 1 |
| 1% citric acid coating | 6,323 | 5 | 4 | | |
| Plain intermediate moisture ration | 3,727 | 1 | 1 | 5 | 3 |
| 0.05% hexamic acid coating | 4,045 | 3 | 5 | | |

We claim:

1. A method of enhancing the palatability of a cat food material comprising coating discrete particles of the cat food material with hexamic acid as a flavor enhancing acid and an edible fat; the flavor enhancing acid being added in proportions of between about 0.05 and 0.3% by weight of the cat food material; the edible fat being added in proportions of between about 5% and 12% by weight of the cat food material, to form a feed product for cats having greatly enhanced palatability and appeal.

2. The method of enhancing the palatability of a cat food material comprising:
   (a) conducting discrete particles of a cat food material through a spray chamber,
   (b) spraying the particles with a dispersion of hexamic acid and a melted edible fat to coat the particles with about 5% to 12% added fat and about 0.05% to 0.3% hexamic acid, based on the total weight of the coated particle,
   (c) conducting the coated particles to a tumbling drum,
   (d) tumbling the coated particles at a temperature above the melting point of the edible fat to uniformly coat the particles with the edible fat, and
   (e) discharging the coated particles from the tumbling drum to cool them to ambient temperature, whereby a cat food product is formed having greatly enhanced palatability and appeal for cats.

3. The method of enhancing palatability of a cat food material comprising:
   (a) conducting discrete particles of a cat food material to a tumbling drum,
   (b) adjusting the moisture content of the particles to about 30% while tumbling the particles in the drum,
   (c) spraying the particles with a melted edible fat and tumbling the particles in the drum to coat the particles with about 5% to 12% added fat based on the total weight of the coated particles,
   (d) adding hexamic acid to the particles, tumbling the particles in the drum to coat the particles with about 0.05% to 0.3% hexamic acid based on the total weight of the coated particles, and
   (e) discharging the coated particles from the tumbling drum to cool them to ambient temperature, whereby a cat food product is formed having greatly enhanced palatability and appeal for cats.

4. A cat food material having increased palatability and appeal for cats comprising a nutritious feed mass and an added hexamic acid coating, the hexamic acid being present in an amount between about 0.05% and 0.3% by weight of the animal feed.

5. The cat food composition of claim 4, wherein the cat food composition has between about 5% and 12% of an added edible fat.

6. The product of claim 5, wherein the added edible fat is selected from the group consisting of lard and tallow.

References Cited

UNITED STATES PATENTS

| | | | |
|---|---|---|---|
| 1,318,174 | 10/1919 | Plaisance | 99—224 |
| 2,500,919 | 3/1950 | Cahn | 99—16 |
| 2,275,125 | 3/1942 | Audrieth et al. | 99—140 |
| 3,030,213 | 4/1962 | Tidridge et al. | 99—140 |
| 3,139,342 | 6/1964 | Linskey | 99—2 |
| 3,115,409 | 12/1963 | Hallinan et al. | 99—7 |

NORMAN YUDKOFF, Primary Examiner

C. P. RIBANDO, Assistant Examiner

U.S. Cl. X.R.

99—166